US005359575A

United States Patent [19]
Williams et al.

[11] Patent Number: 5,359,575
[45] Date of Patent: Oct. 25, 1994

[54] UNDERWATER PULSE TRACKING SYSTEM

[75] Inventors: Ross E. Williams, Dobbs Ferry, N.Y.; Bryant G. Ragan, Metairie; Robert H. Kemp, Jr., Harahan, both of La.

[73] Assignee: The Laitram Corporation, Harahan, La.

[21] Appl. No.: 118,076

[22] Filed: Sep. 8, 1993

[51] Int. Cl.$^5$ .............................................. G01S 15/00
[52] U.S. Cl. ...................................... 367/127; 367/98
[58] Field of Search ...................... 367/127, 106, 19, 2, 367/6, 98

[56] References Cited

U.S. PATENT DOCUMENTS

| | | | |
|---|---|---|---|
| 3,614,721 | 10/1971 | Lagoe | 367/127 |
| 4,187,492 | 2/1980 | Delignieres | 367/127 |
| 4,532,617 | 7/1985 | Baecker et al. | 367/19 |
| 4,669,067 | 5/1987 | Roberts | 367/19 |
| 4,845,686 | 7/1989 | Brac | 367/130 |
| 4,862,422 | 8/1989 | Brac | 367/19 |
| 4,992,990 | 2/1991 | Langeland et al. | 367/19 |
| 5,031,159 | 7/1991 | Rouquette | 367/125 |
| 5,142,507 | 8/1992 | Rouquette | 367/134 |
| 5,214,617 | 5/1993 | Rouquette | 367/124 |

FOREIGN PATENT DOCUMENTS 0308222 3/1989 European Pat. Off. .
1455956 11/1976 United Kingdom .

OTHER PUBLICATIONS

R. E. Williams et al., "Time Coherence of Acoustic Signals Transmitted Over Resolved Paths in the Deep Ocean," J. Acoust. Soc. Am., vol. 59, No. 2, Feb. 1976, pp. 312–327.

*Primary Examiner*—Daniel T. Pihulic
*Attorney, Agent, or Firm*—James T. Cronvich

[57] ABSTRACT

Apparatus and methods for improving signal detection and tracking in underwater acoustic devices receiving a set of acoustic pulses propagated in response to repetitive synchronizing events. Each of the set of pulses is correlated with a replica of each pulse in a receiver in the underwater devices during an associated time window. The correlated output of the receiver is compared to an adjustable threshold characteristic in a detector for selection of the actual pulse according to predetermined criteria for each of the set of pulses. An actual time of reception relative to the synchronizing event is assigned to the selected pulse. Previous actual times of reception are used to estimate the expected time of reception of the associated pulse relative to the next synchronizing event. The estimate is used to adjust the associated time window to encompass the expected time of reception. Previous actual times of reception are compared to corresponding estimated times of reception to develop a measure of the quality of the estimates. The shape of the threshold characteristic and the width of the associated time window are adjusted as a function of the measure of the quality. A preferred threshold characteristic has a parabolic shape with its vertex defining a minimum threshold level at the expected time of reception. High quality measures lower the minimum threshold and narrow the parabola and the time window; low quality measures raise the minimum threshold level and broaden the parabola and the time window. Adaptive signal tracking is thereby provided.

25 Claims, 6 Drawing Sheets

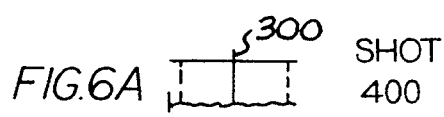 FIG.6A  SHOT 400

TIME
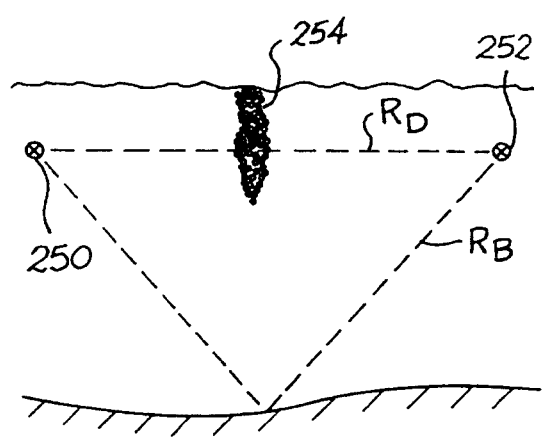
FIG. 2
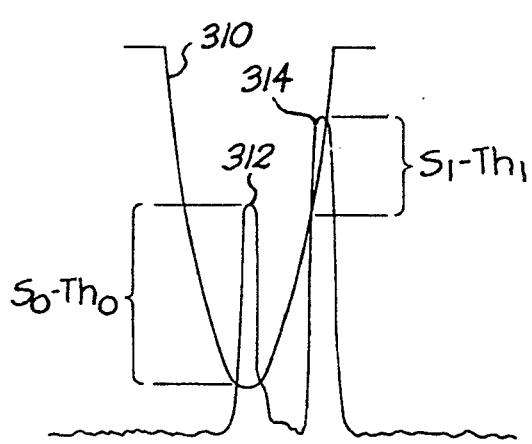
FIG. 7

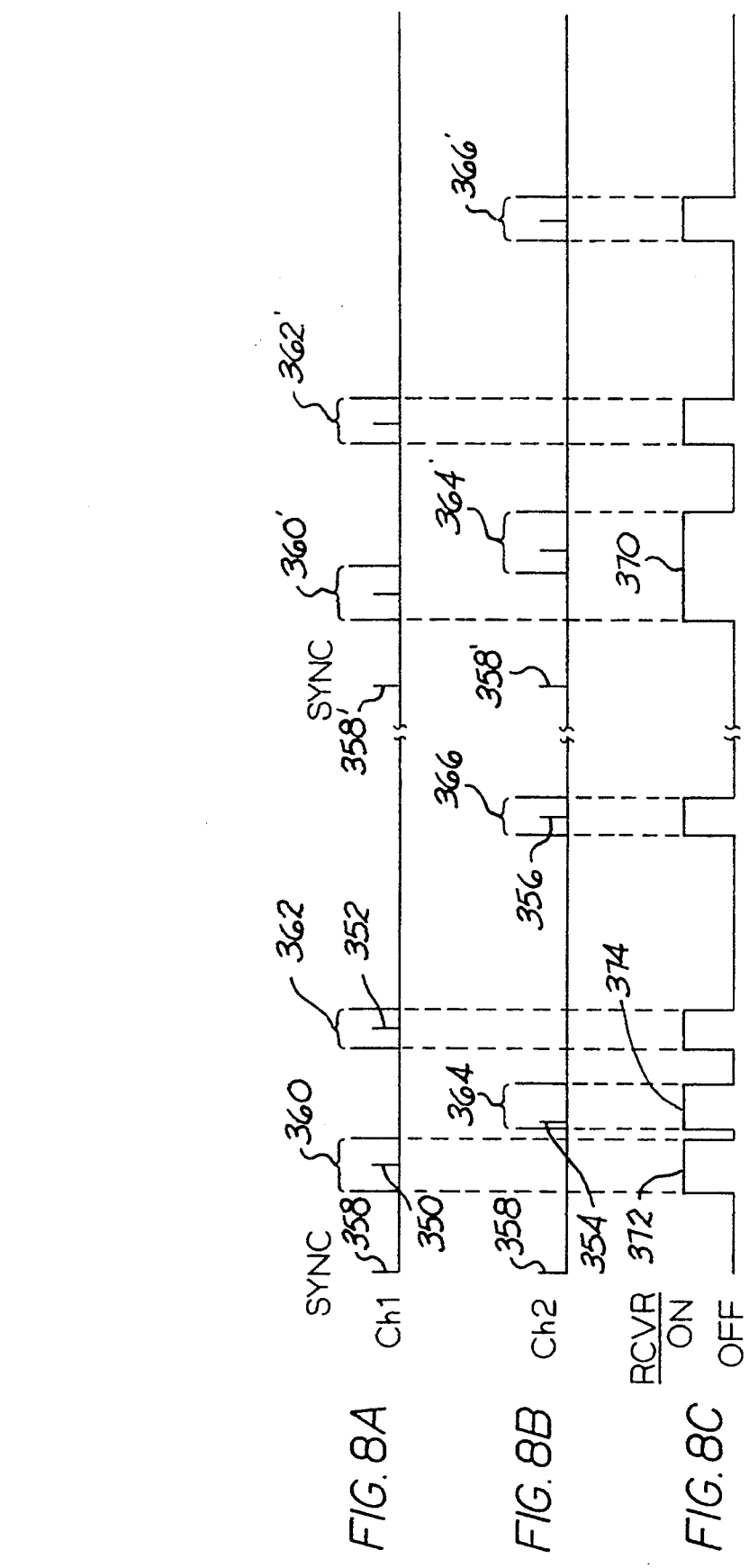

UNDERWATER PULSE TRACKING SYSTEM

BACKGROUND

The invention relates to apparatus and methods for tracking underwater acoustic signals and, more particularly, to an improved acoustic pulse detection and tracking system in an underwater ranging system comprising a number of hydroacoustic transmitters and receivers deployed along seismic sources and hydrophone cables for the purpose of determining their relative locations.

Hydroacoustic ranging systems are used to determine the relative locations of positions on hydrophone-arrayed seismic streamer cables and seismic sources towed behind ships performing marine seismic surveys. High-resolution surveys require accurate estimates of the locations of the seismic source and hydrophone receivers, which can be determined from the relative locations. Typical ranging systems capable of providing the required accuracy comprise a number of transmitters and receivers attached at various positions along the streamers. Individual transmitters and receivers or transceivers can also be installed on the platform supporting the seismic energy source, on head-end buoys, and on tail-end buoys. Ranges between pairs of transmitter and receiver locations are measured by the transit times of pulses transmitted at more or less regular intervals by the transmitters and received by the receivers. The ranges or the transit times are reported to a host computer for on-line estimation of the array and source locations or for storage for later off-line processing.

Commercial ranging systems are manufactured by Sonardyne of Hants, United Kingdom, Syntron, Inc. of Houston, Tex., and DigiCOURSE, Inc. of Harahan, La., a wholly-owned subsidiary of the assignee of this invention. Many of the details of the DigiCOURSE system for streamer location estimation are described in U.S. Pat. No. 5,031,159, issued Jul. 9, 1991, in the name of Robert E. Rouquette. Although the ranging system of Rouquette operates well, certain adverse conditions can cause problems. For example, in high sea states, the acoustic noise level increases relative to the signal level, making detection more difficult, especially at longer ranges. Variations in sea state and ambient noise conditions also degrade system performance.

Another significant problem is caused by the bubble curtain generated by the seismic source, the ship's wake, or propeller cavitation. For, example, the collapse of the large air bubble produced by the seismic blast sheds millions of small bubbles that trail the seismic source platform in the form of a bubble curtain. Consistent ranges through the bubble curtain are difficult to obtain because the bubbles attenuate the acoustic pulses and strengthen reverberation and forward scattering, thereby degrading pulse detection. The Sonardyne and the Syntron systems attempt to solve the problem by transmitting sequences of acoustic pulses and determining reception quality by the number of pulses from the sequence successfully received. One problem with that solution is that the total time required to transmit and receive the complete sequence of pulses is long and usurps valuable time needed with large acoustic networks to obtain all the necessary ranges. Furthermore, transmitter and receiver duty cycles are long, leading to increased power consumption and decreased battery life in typical battery-powered applications.

To solve the foregoing problems, there is a need for an improved acoustic ranging system usable in large acoustic networks and capable of producing consistent, high-quality ranges in a variety of adverse operating conditions, especially those characterized by high or varying ambient noise or by severe signal attenuation, reverberation, or forward scattering.

SUMMARY

An improved underwater acoustic ranging system with novel pulse tracking satisfies this need. The pulse tracking apparatus is connected to an acoustic transducer, which converts impinging acoustic energy into electrical energy. A receiver, enabled during an adjustable time window, extracts pulse signals from the electrical energy. The extracted pulse signals represent individual acoustic pulses having predetermined characteristics and transmitted in response to a repetitive synchronizing event by acoustic transmitters located on streamer cables or other underwater apparatus. A pulse detector having an adjustable detection threshold characteristic selects the pulse signal whose amplitude exceeds the detection threshold by the greatest amount as the signal of interest. A reception time coincident with detection and relative to the synchronizing event is assigned to the signal of interest. The time of reception is used to adjust the detection threshold characteristic and the receiver time window in anticipation of the next expected pulse signal corresponding to the next synchronizing event.

In a preferred embodiment, the detection threshold characteristic is parabolic, with the vertex of the parabola centered within a detection window at a minimum threshold level. The tracking apparatus estimates the time of arrival of the next expected pulse from the times of reception of the most recent pulses. The estimated time of reception is a first parameter used to adjust the time position of the threshold characteristic. The width of the parabola and the depth of the vertex, or the minimum detection level, are adjusted with a second parameter representative of the quality of the foregoing estimates. Good estimates narrow the parabola and lower its vertex; poor estimates widen the parabola and raise its vertex. Measurements of the noise level taken when no pulses are expected are used to normalize the threshold characteristic. Thus, excellent discrimination of signal from interference and immunity from variations in ambient noise are achieved.

In another embodiment of the invention, the pulse tracking apparatus is joined with a matched-filter receiver using a replica of a pulse transmitted by remote acoustic transmitters and characterized by a high time-bandwidth product to extract the transmitted pulse from ambient acoustic noise. The preferred signal is a swept-FM pulse having a hyperbolic frequency-versus-time characteristic and a pulsewidth of about 10 ms. Such a pulse provides sufficient energy to penetrate the bubble curtain and exceed the noise level with high resolution for accurate ranging.

DRAWINGS

These and other features, aspects, and advantages of the present invention will become better understood with reference to the following description, appended claims, and accompanying drawings in which:

FIG. 2 is an elevational view of an underwater deployment of a pair of transceivers according to the invention showing a direct range occluded by a bubble curtain and further showing a bottom-reflected range;

FIGS. 6A–6K are a sequence of plots exemplifying the adaptive thresholding and pulse tracking provided by the tracking apparatus of FIG. 3;

FIG. 7 is an illustration of the detection criteria of the tracking apparatus of FIG. 3;

FIGS. 8A–8C are a timing diagrams depicting the relation between detector time windows on each channel and the overall receiver time windows in a simplified configuration of the tracking apparatus of FIG. 3.

DESCRIPTION

Figure 1:
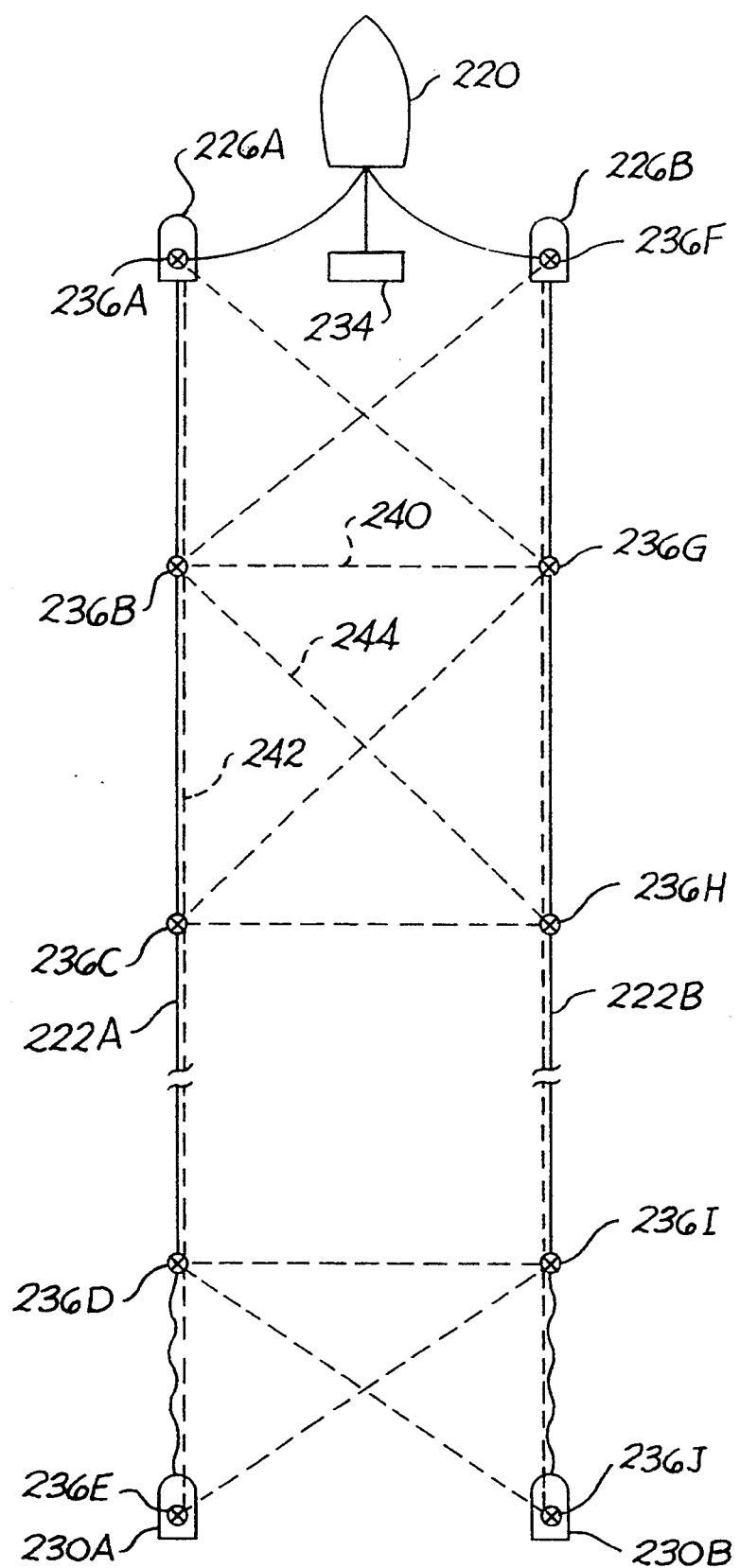
FIG. 1 is an overhead plan view schematically showing an exemplary deployment of the improved acoustic ranging system of the invention in a marine seismic survey.
Figure 6B:
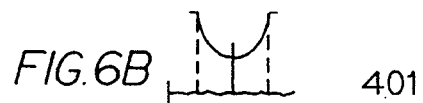
Figure 6C:
Figure 6D:
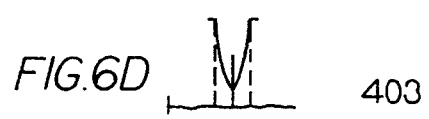
Figure 6E:
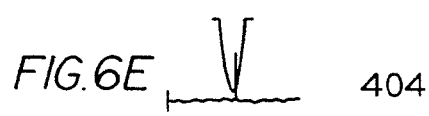
Figure 6F:
Figure 6G:
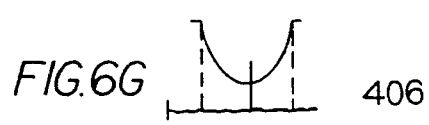
Figure 6H:
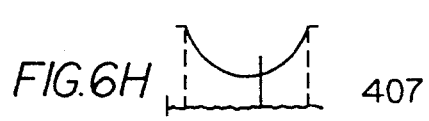
Figure 6I:
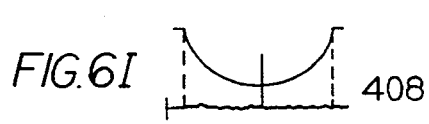
Figure 6J:
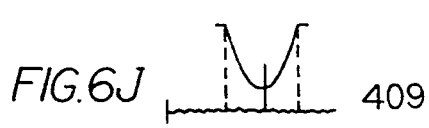
Figure 6K:
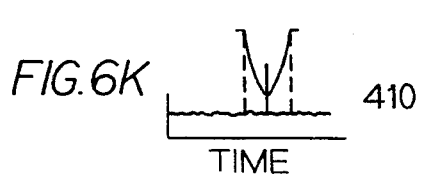

FIG. 1 shows an idealized plan view of an exemplary seismic survey deployment. A towing vessel 220 pulls two hydrophone-arrayed streamers 222A, 222B. Each streamer is outfitted with a number of associated hydroacoustic transceivers 236A-E, 236F-J attached at known positions. The head ends of the streamers 222A, 222B are marked by head-end buoys 226A, 226B. Tail buoys 230A, 230B attached by cable to the ends of the streamers 222A, 222B mark the tails. Underwater sleds attached to the tail buoys 230A and 230B include transceivers 236E, 236J. Transceivers could also be attached to the towing vessel 220 and to the seismic source 234. A network of acoustic ranges between pairs of transceivers is established, as exemplified by the in-line range 242 between transceivers 236B and 236C, the cross range 240 between transceivers 236B and 236G, and the diagonal range 244 between transceivers 236B and 236H. The ranges are determined by the transit times of pulses transmitted and received by the transceiver pairs. With transceivers, two-way ranges in which each transceiver of a pair receives a pulse from the other can be developed for better accuracy and quality. Alternatively, the transceivers could be replaced by individual transmitters and receivers at each position or by transmitters at some positions and receivers at others. In the latter case, only one-way ranges are achieved.

A preferred transceiver is a modified version of the transceiver described in aforementioned U.S. Pat. No. 5,031,159, which is hereby incorporated by reference. The preferred transceiver includes a transducer for converting hydroacoustic energy into electrical energy and vice versa. A transmitter portion of the transceiver synthesizes a pulse waveform having preselected characteristics on one of five channels between 50 kHz and 100 kHz. The synthesized pulse is transmitted into the water at a scheduled time through the transducer for reception by one or more of the transceivers. Each transceiver includes a matched-filter receiver matched to the set of transmitted pulses on the five channels. Times of arrival, or times of reception, of the transmitted pulses are assigned to the pulses as they are detected by the receiver. All times measured by the transceiver are referenced to the more or less periodic firing of the seismic source by a synchronizing signal communicated to the transceivers. Transit times and, therefore, ranges between pairs of transceivers can be determined by comparing times of reception with times of transmission, as described in detail in the incorporated patent. (Hereinafter, all times of transmission and reception are understood as referenced to the occurrence of an associated, generally regular synchronizing event, such as a synchronizing pulse communicated to each transceiver in coordination with each seismic shot.)

As shown in FIG. 2, an acoustic path defining a direct range $R_D$ between a first transceiver 250 and a second transceiver 252 can be occluded by, for example, a bubble curtain 254 produced by the collapse of the initial seismic bubble defining each shot. The small bubbles constituting the curtain 254 attenuate acoustic pulses transmitted through it, thereby making reception intermittent and degrading the quality of the ranges through it. In fact, often an acoustic pulse following a longer bottom-reflected path defining a range $R_B$ is received with a greater amplitude than the pulse along the direct path. If the less attenuated reflected pulse is mistakenly interpreted as the direct pulse, a range error of $R_B-R_D$ results. Poor quality ranges can also occur whenever the ambient acoustic noise level rises relative to the signal level, such as in high sea states.

Figure 3:
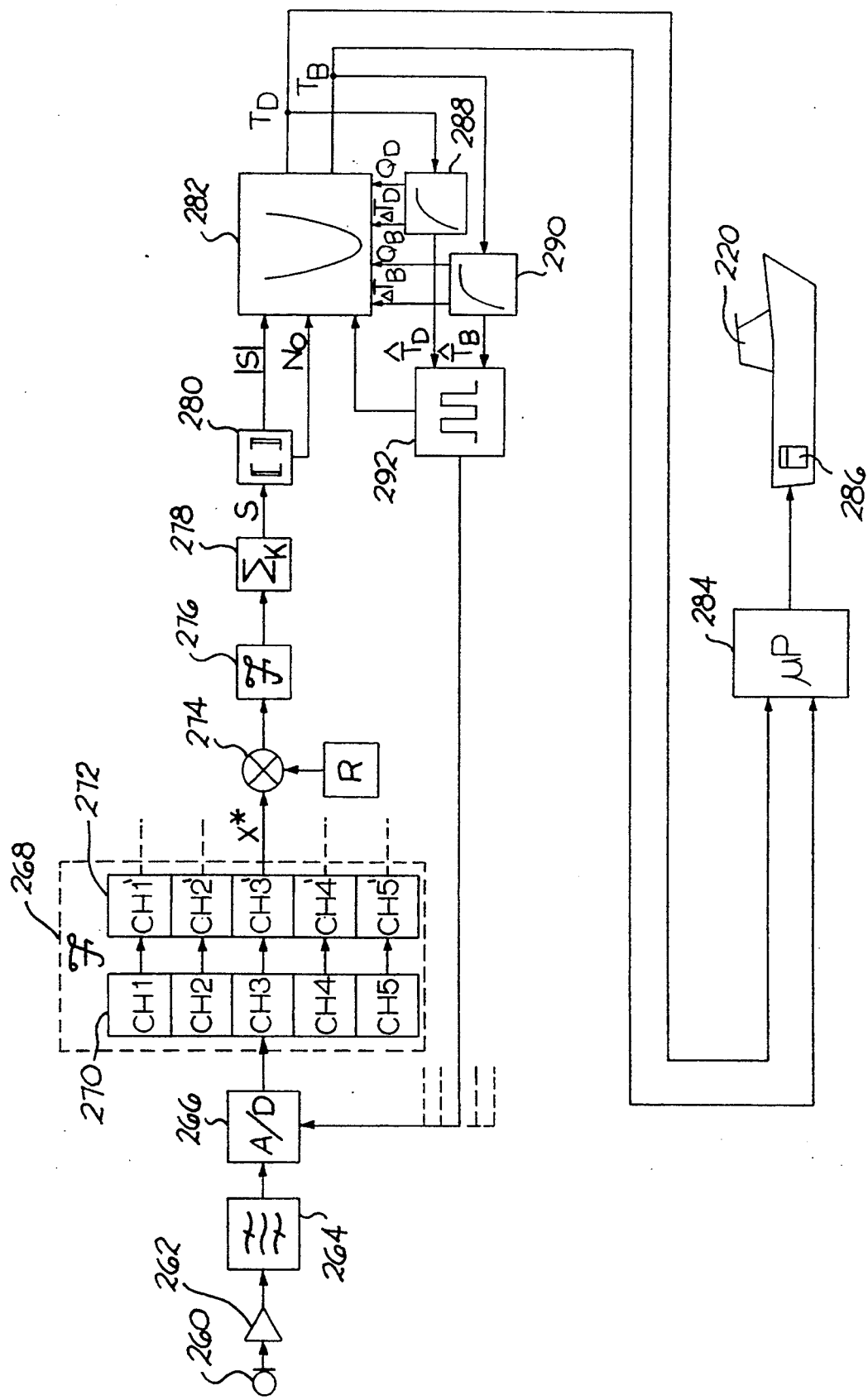
FIG. 3 is a schematic block diagram including the pulse tracking apparatus of the invention.

For developing quality ranges in the presence of adverse conditions, a ranging system having an adaptive detection threshold and pulse tracking is provided. A block diagram of the receiving portion of one embodiment of the invention, which represents an improvement over the receiver of the incorporated patent, is shown in FIG. 3. A transducer 260 converts hydroacoustic energy impinging on it into electrical energy amplified in a low-noise pre-amplifier 262. A bandpass filter 264 attenuates noise outside the signal passband, which is from 50 kHz to 100 kHz. The amplified filtered analog energy is sampled at a rate of 100 kHz and converted into a sequence of digital words by an analog-to-digital (A/D) converter 266. Upon accumulation of a frame containing a selected number, preferably 1024, of samples, the samples are time-reversed, padded with 512 null words on either side, and Fourier-transformed as indicated by block 268. The Fourier transform, as well as most of the subsequently described processing, is performed by a digital-signal-processor (DSP), such as the Motorola DSP56000, implementing a Fast-Fourier Transform (FFT) algorithm. Because the sampling rate is 100 kHz, the 50 kHz-to-100 kHz spectrum is effectively folded about 50 kHz into the 0 kHz-to-50 kHz band as described in the incorporated patent. The 2048-point FFT performs two functions. First, as indicated by block 270, the sampled data are channelized into five channels (Ch1–Ch5) each covering a separate 10 kHz band between 0 kHz and 50 kHz. The FFT also downshifts each of the five channels into a 0 kHz-to-10 kHz band (Ch1'–Ch5'), as indicated by block 272. The data out of each of the five channels of the FFT comprises about 205 points representing the complex conjugate Fourier transform X* of the input pulse on the associated channel for each sample frame. Each of the five channels is processed in parallel and identically. A description of one channel is sufficient. The complex conjugate Fourier transform X* of the input pulse is multiplied by a replica R of the Fourier transform of the downshifted signal expected by the receiver in a complex multiplier 274. A 512-point Fourier transform of the product RX*, blank-padded with 307 null words, is performed as indicated by block 276 and is combined with the results of transforms of consecutive frames of data performed by block 276 in an overlap-and-add processor 278 to produce a sequential measurement S of the correlation of the input energy with the expected pulse. The magnitude of the correlation is taken by a complex-magnitude block 280 to produce a sequential correlation measurement |S| of the signal level, if the pulse is present. When the pulse is known not to be present, such as just prior to the scheduled transmission of any pulses, the output of the magnitude block 280 represents the noise level $N_o$ in the channel's band. Time decimation of 4:1 caused by the Fourier-transform processes results in a temporal resolution of 40 μs in the 100 kHz sampled system. There has been described to this point a five-channel, matched-filter receiver, the magnitude of the output of which is a portion of the autocorrelation function of the received pulse.

The receiver output signal representing underwater acoustic pulses, in this case, the correlation function of the received pulse, is compared with a time-varying, adjustable threshold in a detector 282. According to a preferred predetermined detection criterion, the point on the correlation function that exceeds the threshold by the greatest amount represents the detection of a pulse, to which a time of reception is assigned. The receiver can be enabled for reception of the pulse using a direct path and later enabled for reception of the pulse along a bottom-reflected path. The time of reception is indicated by $T_D$ for the direct path and $T_B$ for the bottom-reflected path. The times of reception are sent to a communications controller 284, such as a microcontroller in the transceiver, and transmitted to a central controller 286 on the towing vessel 220. The central controller 286 transmits a synchronization signal to the communications controller 284 to synchronize all the transceivers in the network periodically to the shots.

The shape and time position of the detection threshold characteristic are adjusted by threshold adjustment filters 288, 290. The first filter 288 adjusts the threshold characteristic for the direct pulse, and the second filter 290 adjusts the detection threshold for the reflected pulse. The filters 288, 290 also produce estimates $\hat{T}_D$, $\hat{T}_B$ of the times of reception of the direct and reflected pulses during the next shot. From the estimates $\hat{T}_D$, $\hat{T}_B$, an aperture controller 292 controls the opening and closing of the detection windows of the detector 282 and, along with the estimates from the aperture controllers on the other channels, the on and off times of the A/D converter 266 and, thereby, the receiver.

Figure 4:
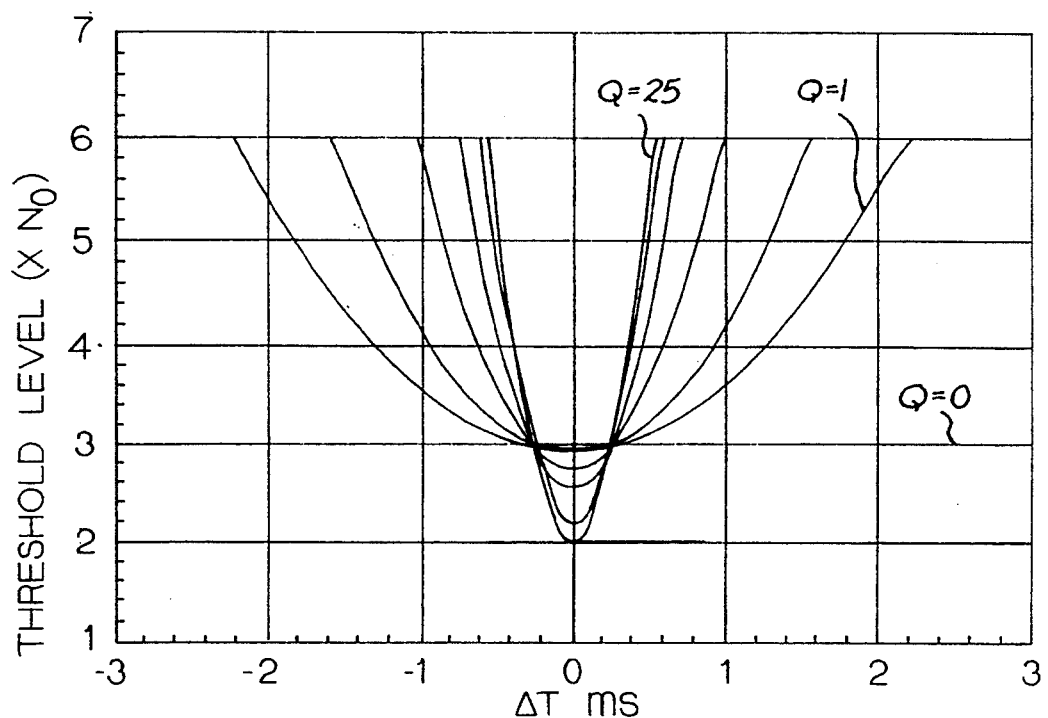
FIG. 4 is a graph of a representative family of detection threshold characteristics provided by the pulse tracking apparatus of FIG. 3.

The preferred detection threshold characteristic is illustrated in FIG. 4, which shows a family of threshold parabolas centered in time at the predicted arrival $\hat{T}$ of the next pulse. The width of the parabola is adjusted by changing its quality factor, or Q, from one shot to the next. The quality factor Q is a measure of the quality of the predictions of the times of reception of the previous few pulses. As the predictions improve, the quality factor Q is increased, narrowing the detection interval, or window, and lowering the threshold at the expected time of reception. As the predictions degrade, Q is decreased, widening the detection interval, and increasing the threshold at the expected time of reception.

Figure 5:
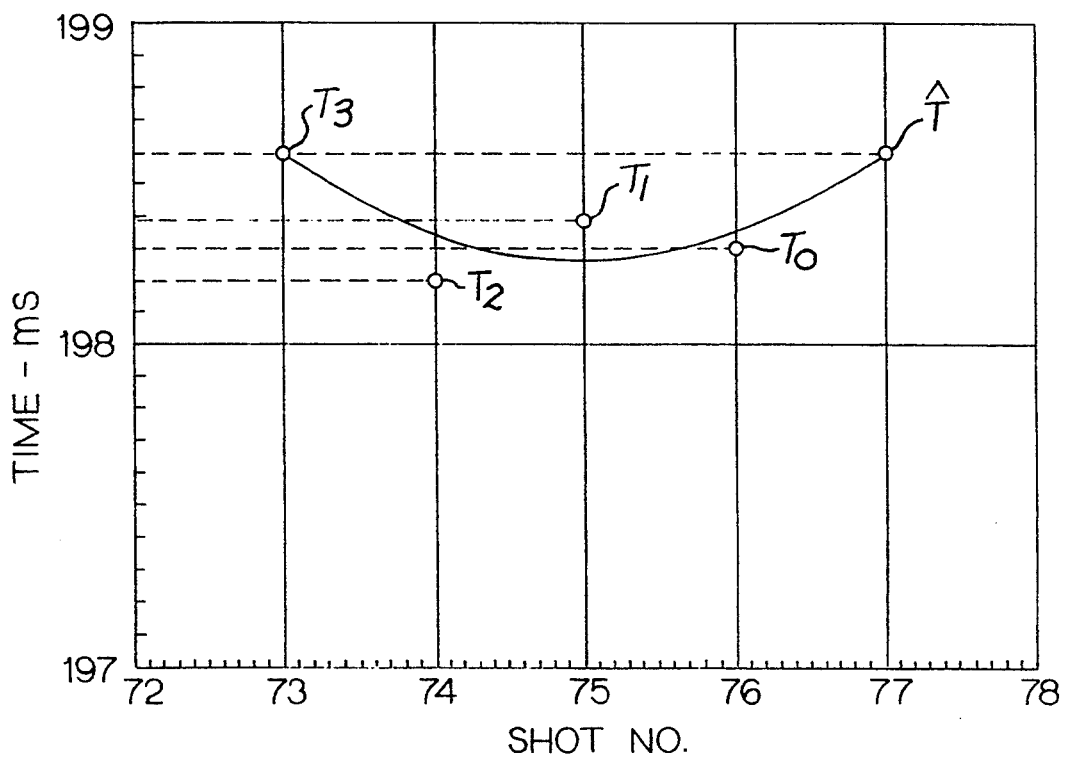
FIG. 5 is a chart illustrating the estimation of the expected time of reception of a pulse based on the times of reception of previous pulses in accordance with the tracking apparatus of FIG. 3.

The times of reception of the pulse for the previous few shots are used to develop an estimate T of the time of reception of the pulse during the next shot. The threshold adjustment filter associated with a given range, e.g., the direct-range filter 288, performs a least-squares fit of the previous four times of reception $T_0$, $T_1$, $T_2$, $T_3$ to derive an estimate $\hat{T}$ of the next time of reception, as shown in the example of FIG. 5. In a preferred version, the prediction equation used is $\hat{T}=a_0T_0+a_1T_1+a_2T_2+a_3T_3$, where $a_0=2.25$, $a_1=-0.75$, $a_2=-1.25$, $a_3=0.75$, and $a_0+a_1+a_2+a_3=1$. Thus, the adjustment filter 288 is realized as a finite-impulse-response (FIR) digital lowpass filter. The estimate $\hat{T}$ is sent to the detector 282 to adjust the center of the threshold characteristic.

The adjustment filter 282 also establishes the quality factor Q according to $Q=1/(\epsilon_0^2+\epsilon_1^2+\epsilon_2^2+\epsilon_3^2)$, where $\epsilon_i=T_i-\hat{T}_i$, i.e., the difference between the actual arrival of the ith pulse and its previously estimated arrival. The Q value is also sent to the detector 282 to adjust the shape of the threshold characteristic for the next shot. In the event that no pulse is detected within the detection window the estimated time of reception is used as the reception time for purposes of estimating the next expected time of reception. For the purposes of threshold shape adjustment the quality factor Q is calculated as though a pulse were received at an edge of the detection window. Thus Q is decreased. Finally a null range is reported to the central controller, which recognizes null ranges as faulty.

The detection threshold parabolas shown in FIG. 4 are described by the equation $Th=Th_o e^{-bQ}+cQ(\Delta T)^2$, where $Th_o$ is the upper limit of the minimum threshold level, b is a constant related to the minimum threshold level at the highest allowable Q, c is a constant related to the width of the threshold characteristic, and $\Delta T$ is the independent variable representing the deviation from the predicted reception time of the next expected pulse. For a range of Q from 1 to 25, $Th_o=3N_o$, a minimum threshold of $2N_o$ for $Q=25$, and a maximum width of $\Delta T=\pm 0.5$ ms at $6N_o$ for $Q=25$, $b=0.0162$ and $c=0.64N_o$.

The points at which the threshold characteristics reach the $6N_o$ level define the width of the detection window. For the example of FIG. 4, the narrowest window is $\pm 0.5$ ms for a Q of 25, and the width for a Q of 1 is $\pm 2.2$ ms. For Q values less than 1, the parabola flattens, but the full window is restricted to a user-selectable width for example, $\pm 20$ ms. For $Q=0$, for example, at the start of pulse acquisition or after a range has been lost for a few shots, the threshold characteristic is given by a constant baseline level of $3N_o$ throughout a user-selected $\pm 20$ ms window. It should be understood that the specific constant values given here are examples; other values are within the scope of the invention. Likewise, functions other than those described herein can be used to estimate $\hat{T}$ and to compute Q. Thus, it has been shown that the adaptive threshold characteristic can be adjusted in width and depth with a first parameter Q and can be offset in time with a second parameter $\hat{T}$.

The threshold characteristic shown in FIG. 4 is normalized to the noise level $N_o$. At the start of each shot interval, prior to the expected arrival of any pulses, the noise level $N_o$ of each receiver is measured and sent to the detector 282 to scale the threshold characteristic.

The performance of the adaptive threshold and signal tracking system is illustrated in the sequence of shot point frames in FIGS. 6A–6K. The signal 300, given by the peak of its autocorrelation function is shown to be stationary in shots 400–403, then to gradually retard in shots 404–407, and to again become stationary at a later time in shots 408–410. At the start, the degenerate parabola, or flat threshold characteristic for Q=0, open for a maximum window indicated by the vertical broken lines, is used. The reception of the pulse 300 in the center of the window increases Q and narrows the receiver window without adjusting T for the next shot 401. As the pulse remains stationary for the next few shots the threshold characteristic and the receiver window narrow as Q increases.

As the arrival of the pulse is gradually retarded in shots 404–407, the parabola broadens and retards in shots 405–408. As the pulse becomes stationary again in shots 407–410, the parabola narrows as Q increases, and finally centers on the stationary pulse arrival time in shot 410.

The preferred detection criterion is illustrated in FIG. 7. For the threshold characteristic 310 shown, a peak of the output of the receiver representing the actual signal 312 is shown coincident with the minimum threshold $Th_o$. Another peak of the output of the receiver representing an unwanted interfering signal 314 is shown at a later time within the detection window. The amplitude $S_o$ of the actual signal 312 exceeds the threshold $Th_o$ by an amount $S_o$-$Th_o$, while the amplitude $S_1$ of the interference 314 exceeds the corresponding threshold level $Th_1$ by $S_1$-$Th_1$. Although the interference level $S_1$ is greater than the actual signal level $S_o$, the actual signal is selected by the detector 282 because the excess ($S_o$-$Th_o$) of the actual signal 312 above the threshold exceeds the excess ($S_1$-$Th_1$) of the interference level above the threshold characteristic. Thus, the detector is effective at discriminating between signal and interference.

As mentioned hereinbefore, the detector for each channel can be set up to receive a number of non-coincident pulses, such as a direct pulse 350 and a reflected pulse 352 arriving later on Channel 1 in the simple example depicted by the timing diagrams of FIGS. 8A–8C for only two channels. Similarly, each channel could be set up to track pulses received from a number of transmitters as long as the reception times are staggered, as exemplified by the pulses 354 and 356 received on Channel 2. After the synchronizing signal 358 is received, a first window 360 on Channel 1 is opened to receive the direct pulse 350. A little later a second window 362 is opened on Channel 1 to receive the reflected signal 352. On Channel 2, a first window 364 is opened to receive the pulse 354 and later a second window 366 is opened to receive the pulse 356, typically from a transmitter other than that transmitting the first pulse. As long as any window on any channel is open, the receiver is enabled (in the ON state as indicated by the RCVR timing diagram of FIG. 8C); otherwise, the receiver is disabled (OFF). Thus, each channel can have a number of non-overlapping reception windows and corresponding adaptive threshold characteristics for each range being tracked. After reception of another synchronizing signal 358', the process generally repeats itself with the windows tracking the expected times of reception of the corresponding pulses. Because the first pulse 354 on Channel 2 arrived early in the detection window 364, the window is advanced for the next expected arrival of the pulse after the subsequent sync signal 358'. The advanced window 364' on Channel 2 overlaps the first window 360' on Channel 1. The overlap is across channels and causes no problems. The receiver is enabled for a single long period 370 after the second sync 358', rather than for two shorter intervals 372 and 374 as for the first sync 358. Because the receiver is enabled by the logical-or of all the windows for all the channels and disabled otherwise, it serves lighter duty, and power is conserved. Furthermore, because the reception windows adapt to the signals being tracked, the windows are generally narrower than they would be for constant-width windows.

In an environment in which the direct path between transmitter and receiver is completely or intermittently occluded, a bottom-reflected path may be more stable. If the reflected ranges are of good quality, they can be used to qualify direct ranges of questionable quality or even to estimate a direct range based on knowledge of the geometry of depth of the sea bottom beneath the transmitter and receiver. In this way higher quality ranges can be achieved in difficult situations.

Figure 9:
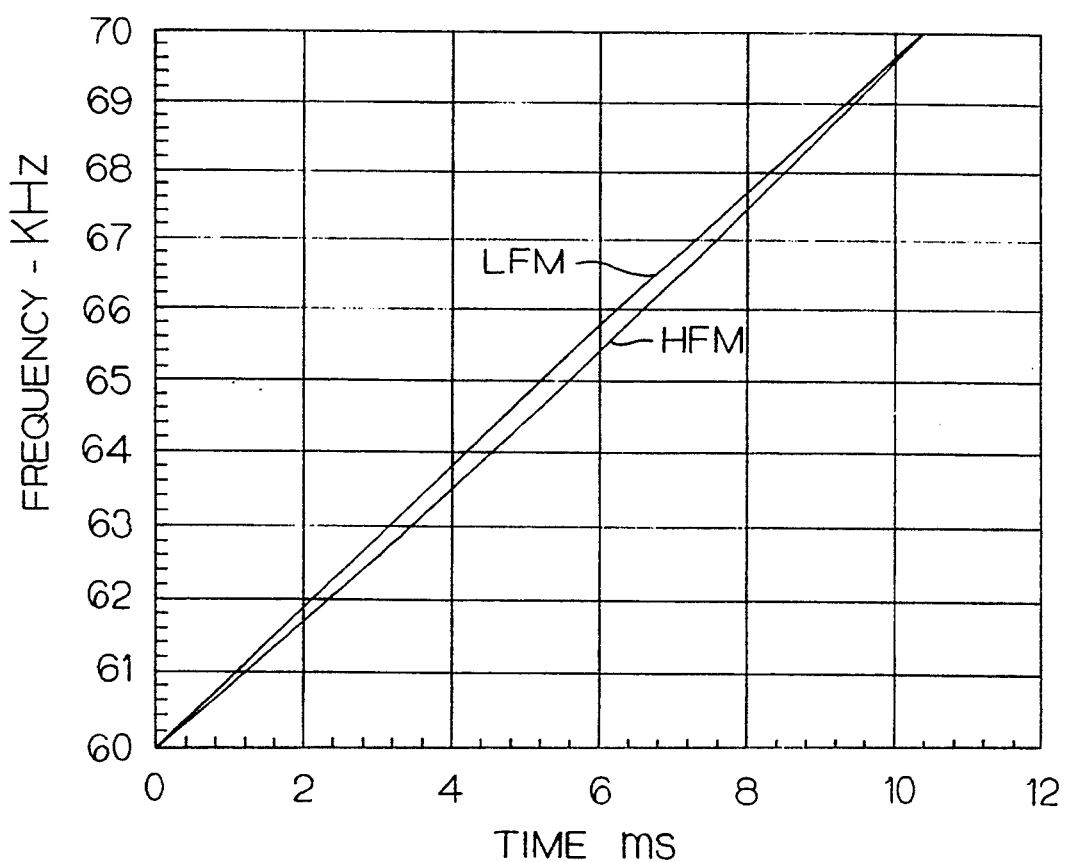
FIG. 9 is a graph of the frequency-versus-time characteristic for a preferred pulse on one channel of the ranging system of the invention.

Another way the quality of acoustic ranges is improved, especially in noisy environments, is by increasing the time-bandwidth product of the selected signal set. Signals having large time-bandwidth products and characterized by high transmitted energy with a narrow autocorrelation function for good temporal resolution are desirable in this application. One such family of signals are FM-swept signals whose frequency-versus-time characteristics are exemplified in FIG. 9. Two kinds of FM signals are shown. The first is linear FM (LFM), for which the frequency varies linearly with time, i.e., $f(t)=(f_2-f_1)t/T+f_1 0 \leq t \leq T$, where $f_1$ and $f_2$ are the lower and upper frequencies and T is the pulse duration. The other signal is hyperbolic FM (HFM), in which the frequency varies with time according to a hyperbolic function, i.e., $f(t)=f_1 f_2/[(f_1+f_2)-t(2W/T)]$ for $-T/2 \leq t \leq T/2$, where $f_1$ and $f_2$ are the lower and upper frequencies, W is the bandwidth, and T is the pulse duration. Details of both these signals are given in the article, "Time Coherence of Acoustic Signals Transmitted Over Resolved Paths in the Deep Ocean," by R. E. Williams and H. F. Battestin, J. Acoust. Soc. Am., Vol. 59, No. 2, February 1976. Both swept signals have large time-bandwidth products. In addition, the HFM signal is doppler-invariant so that the signal is not affected by motion of the transmitter relative to the receiver, which can provide a benefit with certain high-speed seismic source or receiver dynamics. Thus, the preferred pulse is an HFM signal of duration 10.24 ms swept over a 10 kHz range as shown in FIG. 9 for channel 2 (60 kHz to 70 kHz). Such a pulse has a time-bandwidth product on the order of 100 and an autocorrelation function with a main-lobe width of about 0.1 ms. Thus, the receiver compresses the 10 ms acoustic pulse into a 0.1 ms autocorrelation signal for high temporal and, consequently, spatial resolution. The complete signal set includes similar HFM signals on each of the five channels between 50 kHz and 100 kHz. Additional signal sets having similar qualities can be used to decrease interference between different sections of the streamer. For example, transmitters and receivers near the ends of the streamers could transmit down-swept HFM signals, while front-end devices could transmit up-swept HFM signals. Coefficients representing the FM pulses are stored in the transceiver and used to synthesize a pulse having a high time-bandwidth product, which is transmitted at the scheduled transmission time. In conjunction with the matched-filter receiver containing a replica R of the Fourier-transform of the pulse, a significant processing gain can be realized, thereby improving the detectability of the FM pulse over the preferred pulse of the reference patent.

Although the invention has been described in considerable detail with reference to certain preferred versions thereof, other versions are possible. For example, the signal representative of the underwater acoustic signal could be extracted by means other than the matched-filter receiver with pulse compression as described herein. An envelope detector could replace the matched-filter receiver in some simple applications, with the envelope, rather than the autocorrelation function, of the pulse compared to the threshold characteristic. Furthermore, the signal tracking and thresholding techniques described herein could find application in environments other than underwater acoustics, such as in radar. Therefore, the spirit and scope of the appended claims should not be limited to the description of the preferred versions contained herein.

What is claimed is:

1. An underwater acoustic signal tracking apparatus for tracking individual acoustic pulses propagated underwater in response to a synchronizing event, comprising:
   a) means for synchronizing the tracking apparatus to the synchronizing event;
   b) a transducer for converting underwater acoustic energy into electrical energy;
   c) a receiver connected to the transducer for extracting pulse signals from the electrical energy, the pulse signals representing individual acoustic pulses having predetermined characteristics propagated underwater in response to the synchronizing event, the receiver Further being enabled during an adjustable time window relative to the synchronizing event;
   d) a pulse detector connected to the receiver and having an adjustable detection threshold characteristic varying within the time window, the pulse detector further selecting a maximum pulse signal whose amplitude exceeds the detection threshold characteristic according to a predetermined criterion during the time window;
   e) means for assigning a time of reception relative to the associated synchronizing event to the maximum pulse signal; and
   f) means for adjusting the detection threshold characteristic of the pulse detector as a function of the time of reception of the maximum pulse signal.

2. The underwater acoustic signal tracking apparatus of claim 1, wherein the pulse detector comprises an adjustable detection threshold characteristic having a varying shape characterized by a minimum threshold level at a first time $\hat{T}$ within the time window, maximum threshold levels at times corresponding to the edges of the time window, and intermediate threshold levels between the minimum and maximum threshold levels.

3. The underwater acoustic signal tracking apparatus of claim 2, wherein the means for adjusting the detection threshold characteristic estimates the time of reception of the next expected maximum pulse signal from the actual times of reception of prior received maximum pulse signals and further adjusts the threshold characteristic such that the minimum threshold level at the first time $\hat{T}$ occurs at the estimated time of reception of the next expected pulse.

4. The underwater acoustic signal tracking apparatus of claim 3, wherein the means for adjusting compares the actual times of reception with the corresponding estimated times of reception to determine the quality of the estimates, the means for adjusting decreasing the minimum threshold level and narrowing the time window in response to high quality estimates and increasing the minimum threshold level and widening the time window in response to poor quality estimates.

5. The underwater acoustic signal tracking apparatus of claim 2, wherein the adjustable detection threshold characteristic is characterized by a parabolic shape having its vertex centered in the time window at the first time $\hat{T}$.

6. The underwater acoustic signal tracking apparatus of claim 5, wherein the means for adjusting the detection threshold characteristic adjusts the width and the depth of the threshold characteristic by adjusting a first parameter and its time placement by adjusting a second parameter.

7. The underwater acoustic signal tracking apparatus of claim 1, wherein the means for adjusting the detection threshold characteristic further adjusts the level of the threshold characteristic proportional to the noise level.

8. The underwater acoustic signal tracking apparatus of claim 7, further comprising means for measuring the noise level in the receiver at a time when no pulse signals are expected at the receiver, the means for measuring the noise level further communicating the noise level to the means for adjusting for adjustment of the threshold characteristic.

9. The underwater acoustic signal tracking apparatus of claim 1, further comprising means for controlling the receiver by adjusting the time window during which the receiver is enabled as a function of the detection threshold characteristic.

10. The underwater acoustic signal tracking apparatus of claim 1, wherein the pulse detector further comprises a plurality of individual adjustable detection threshold characteristics separated in time and associated with each synchronizing event, whereby a plurality of individual pulses can be detected in coordination with each synchronizing event and tracked.

11. In an underwater acoustic ranging device including a transducer for converting impinging underwater acoustic energy into electrical energy, a receiver connected thereto for extracting pulse signals from the electrical energy, the pulse signals representing a set of acoustic pulses propagated at generally regular intervals relative to a synchronizing event, and means for synchronizing the acoustic ranging device to the event; an improved signal detecting and tracking apparatus, comprising:
   a) a pulse detector connected to the receiver and having a separate adjustable detection threshold characteristic for each of the set of acoustic pulses, each detection threshold characteristic operable within an associated time window relative to the occurrence of the synchronizing event, the pulse detector further selecting a set of maximum pulse signals each of whose amplitudes exceeds the threshold characteristic according to a predetermined criterion during each time window;

b) means for assigning a time of reception relative to the occurrence of the synchronizing event to each of the set of maximum pulse signals; and c) means for adjusting each detection threshold characteristic as a function of the time of reception of each of the maximum pulse signals.

12. The improved signal detecting and tracking apparatus of claim 11, wherein the pulse detector selects a set of maximum pulse signals according to the predetermined criterion of selecting a set of maximum pulse signals each of whose amplitudes exceeds the associated threshold characteristic by an amount greater than for other pulse signals received during each time window.

13. The improved signal detecting and tracking apparatus of claim 11, wherein the means for adjusting each detection threshold characteristic further provides an estimate of the time of reception of the next expected maximum pulse signal during the associated time window relative to the next synchronizing event from the actual times of reception of prior maximum pulse signals received during prior openings of the associated time window.

14. The improved signal detecting and tracking apparatus of claim 11, wherein each detection threshold characteristic is characterized by a shape defining a minimum threshold level at a time $\hat{T}_i$ within the associated time window, maximum threshold levels at times corresponding to the edges of the time window, and intermediate threshold levels therebetween, the means for adjusting further adjusting the edges of each time window as a function of the shape and the minimum threshold time $\hat{T}_i$ of the associated threshold characteristic.

15. The improved signal detecting and tracking apparatus of claim 11, wherein the means for adjusting each detection threshold characteristic further provides an estimate of the time of reception of the next expected maximum pulse signal during the associated time window relative to the next synchronizing event from the actual times of reception of prior maximum pulse signals received during prior openings of the associated time window, the means for adjusting setting the time $\hat{T}_i$ of the minimum threshold level to the estimated time of reception of the next expected maximum pulse signal, the means for adjusting further comparing the actual times of reception with the corresponding estimated times of reception to produce a measure of the quality of the comparison and narrowing the shape of the associated threshold characteristic in proportion to the measure of the quality of the comparison.

16. The improved signal detecting and tracking apparatus of claim 14, wherein the shape of the adjustable detection threshold characteristic is a parabola having its vertex centered in the associated time window at time $\hat{T}_i$.

17. The improved signal detecting and tracking apparatus of claim 14, wherein the means for adjusting broadens the shape of the threshold characteristic and thereby the width of the time window whenever no maximum pulse signal is detected by the pulse detector within the previous associated time window.

18. The improved signal detecting and tracking apparatus of claim 14, wherein the minimum threshold level of the detection threshold characteristic decreases as the shape of the threshold characteristic and the width of the associated time window narrow.

19. The improved signal detecting and tracking apparatus of claim 11, further comprising means for measuring the ambient acoustic noise level at a time when no pulses are expected at the receiver, the means for measuring the noise level further communicating the noise level to the pulse detector to scale the level of the threshold characteristic proportional to the noise level.

20. The underwater acoustic ranging device of claim 11, wherein the receiver comprises matched-filter means for correlating a replica of a swept-FM pulse signal matched to the acoustic pulses with the electrical energy to extract the pulse signals representing the acoustic pulses.

21. The underwater acoustic ranging device of claim 20 wherein the swept-FM pulse signal is characterized by a hyperbolic frequency-versus-time characteristic, whereby the acoustic pulse signal is invariant to relative motion of the receiver and the source of the signal.

22. A method for detecting and tracking in an acoustic receiving device a set of acoustic pulses propagated at generally regular intervals with respect to a repetitive synchronizing event, comprising the steps of:

a) synchronizing the receiving device to the synchronizing event;

b) assigning a set of predetermined pulse characteristics, a set of detection threshold characteristics, and a set of detection time windows to the set of acoustic pulses, each time window being opened during an interval defined by a start time and a stop time relative to the synchronizing event;

c) enabling the receiving device during the opening of each time window to detect pulses;

d) comparing the detected pulses with the associated detection threshold characteristic and selecting a maximum pulse having an amplitude that exceeds the threshold characteristic according to a predetermined criterion as the reception of the associated pulse;

e) assigning an actual time of reception relative to the synchronizing event to the maximum pulse;

f) estimating an expected time of reception relative to the next synchronizing event from at least one of the previous actual times of reception for each time window; and g) adjusting the openings of the set of time windows to encompass the associated expected times of reception.

23. The method of claim 22, further comprising the steps of:

h) comparing at least one of the previous actual times of reception with corresponding previous expected times of reception to derive a measure of the quality of the estimation for each of the set of pulses; and i) adjusting the shape of the associated threshold characteristic and the width of the associated time window as a function of the quality of the estimation.

24. The underwater acoustic signal tracking apparatus of claim 9, wherein the receiver includes filter means for extracting signals on a plurality of channels, each channel having a corresponding pulse detector, means for adjusting the detection threshold characteristic, and means for controlling the receiver, whereby simultaneous detection and tracking of pulse signals on different channels is possible.

25. The underwater acoustic signal tracking apparatus of claim 1, wherein the pulse detector selects a maximum pulse signal according to the criterion of selecting a maximum pulse signal whose amplitude exceeds the detection threshold characteristic by an amount greater than for other pulse signals received during the time window.

* * * * *